United States Patent [19]

Warrington et al.

[11] Patent Number: 4,685,640
[45] Date of Patent: Aug. 11, 1987

[54] AIR VEHICLE

[75] Inventors: John E. Warrington, Toronto; Dale C. Kramer, Port Colborne, both of Canada

[73] Assignee: Hystar Aerospace Development Corporation, Vancouver, Canada

[21] Appl. No.: 770,490

[22] Filed: Aug. 29, 1985

[30] Foreign Application Priority Data

May 6, 1985 [CA] Canada .................................. 480837

[51] Int. Cl.⁴ ................................................ B64B 1/34
[52] U.S. Cl. .................................... 244/29; 244/23 C
[58] Field of Search ................. 244/23 R, 23 A, 23 B, 244/23 C, 24, 26, 29, 30

[56] References Cited

U.S. PATENT DOCUMENTS

| 1,332,787 | 3/1920 | Whalen | 244/29 |
| 3,410,507 | 11/1968 | Moller | 244/23 C |
| 3,658,278 | 4/1972 | Batchelor | 244/29 |
| 4,114,837 | 9/1978 | Pavlecka et al. | 244/26 |
| 4,269,375 | 5/1981 | Hickey | 244/30 |

FOREIGN PATENT DOCUMENTS

| 88806 | 3/1982 | European Pat. Off. | 244/24 |
| 2310918 | 12/1976 | France | 244/26 |
| 2,366,989 | 5/1978 | France | 244/26 |
| 7213624 | 11/1985 | Taiwan . | |
| 3908 | 2/1910 | United Kingdom | 244/26 |
| 8230313 | 10/1982 | United Kingdom . | |

Primary Examiner—Joseph F. Peters, Jr.
Assistant Examiner—Rodney Corl
Attorney, Agent, or Firm—Rogers, Bereskin & Parr

[57] ABSTRACT

An air vehicle for lifting loads generates lift forces from helium gas within a torus-shaped envelope having a central passageway, and from a fan arrangement designed to direct air downwardly through the passageway. Lateral propulsion units are provided on the envelope. In one embodiment, the fan arrangement comprises two fans carried by a saddle supported on the envelope, while in another embodiment a single fan is carried by a gondola suspended from the envelope.

11 Claims, 7 Drawing Figures

AIR VEHICLE

FIELD OF THE INVENTION

This invention relates generally to vehicles for lifting and transporting loads by air. For convenience, a vehicle of this type will hereinafter be referred to as an "air vehicle".

BACKGROUND OF THE INVENTION

So-called "lighter-than-air" air ships and balloons are well-known for load carrying purposes. An aircraft of this type relies on helium or some other gas which is lighter than air to create lift. Hot air balloons are also well-known and rely for buoyancy on the natural tendency of air to rise as its density decreases on heating. Generally, these known type of craft are difficult to control with precision and have not found wide application for commercial load lifting and transporting purposes.

DESCRIPTION OF THE PRIOR ART

United States Patent literature contains numerous examples of prior art proposals for transporting loads by air. For example, the following patents disclose proposals for using air ships and balloons in logging operations:
U.S. Pat. No. 3,221,897 (Matheson)
U.S. Pat. No. 3,249,237 (Stewart)
U.S. Pat. No. 3,270,895 (Stewart)
U.S. Pat. No. 3,369,673 (Mosher)

The following United States patents disclose prior art proposals for lighter-than-air balloons of generally annular form:
U.S. Pat. No. 3,941,384 (Wopschall)
U.S. Pat. No. 1,572,187 (Cooper)
U.S. Pat. No. 213,603 (Apraxine)
U.S. Pat. No. 3,558,083 (Conley et al.)

Proposals for jet propelled air vehicles are to be found in U.S. Pat. Nos. 3,053,483 (Stahmer) and 3,152,777 (McLean).

Eshoo (U.S. Pat. No. 4,326,681) discloses an example of a non-rigid air ship which relies for lift on both heated air and on a gas which is lighter than air.

Batchelor (U.S. Pat. No. 3,658,278) discloses a load transporting system in which a balloon supports a flexible electric line leading from a source of electricity to a load carrying device including a helium filled rotor and means for releasing gas to provide a load carrying force.

An object of the present invention is to provide an air vehicle suitable for use in commercial load carrying operations.

SUMMARY OF THE INVENTION

The vehicle provided by the invention includes an envelope having the general shape of a torus extending about a passageway between top and bottom surfaces of the envelope. The envelope contains a gas, preferably a lighter than air gas. Fan means is carried by the envelope and is arranged to direct air downwardly through the passageway to generate a downwardly vectored thrust for lifting the vehicle. The fan means is controllable to vary the magnitude of the thrust and hence the altitude of the vehicle in flight. The envelope also carries propulsion means for generally lateral propulsion of the vehicle.

In a preferred embodiment, the vehicle provided by the invention derives lift both from the lighter than air gas within the envelope and from the thrust provided by the fan means. It is believed that this provision for lift from two sources will permit the design of a vehicle which is not only capable of lifting relatively heavy loads but in which the altitude of the vehicle can be easily and precisely controlled in use. It is also believed that it will be possible to build and operate such a vehicle quite economically.

For example, the vehicle may be designed so that the gas within the envelope provides sufficient lift to support the weight of the vehicle when unloaded. The fans means need then generate only sufficient thrust to be capable of lifting the load to the required altitude. In another case, the gas could provide positive buoyancy for the unloaded vehicle although this may then require the addition of means for tethering or anchoring the vehicle when unloaded.

The gas within the envelope is preferably, but not essentially, a lighter than air gas such as helium; for example, air could be used in the envelope. In this event means may be provided for heating the air to provide lift.

In a preferred embodiment of the invention, the vehicle includes means for controlling the direction of the thrust vector provided by the fan means, to control the attitude of the vehicle.

A further embodiment provides means for generating additional lift by the so-called swing effect of air flowing over the top surface of the envelope into the passageway through the envelope.

BRIEF DESCRIPTION OF THE DRAWINGS

In order that the invention may be more clearly understood, reference will now be made to the accompanying drawings which illustrate a number of preferred embodiments of the invention by way of example, and in which:

FIG. 6 is a vertical sectional view through the vehicle shown in FIGS. 4 and 5; and, FIG. 7 is a vertical sectional view on line 7-7 of FIG. 6.

DESCRIPTION OF THE PREFERRED EMBODIMENTS

Figure 1:
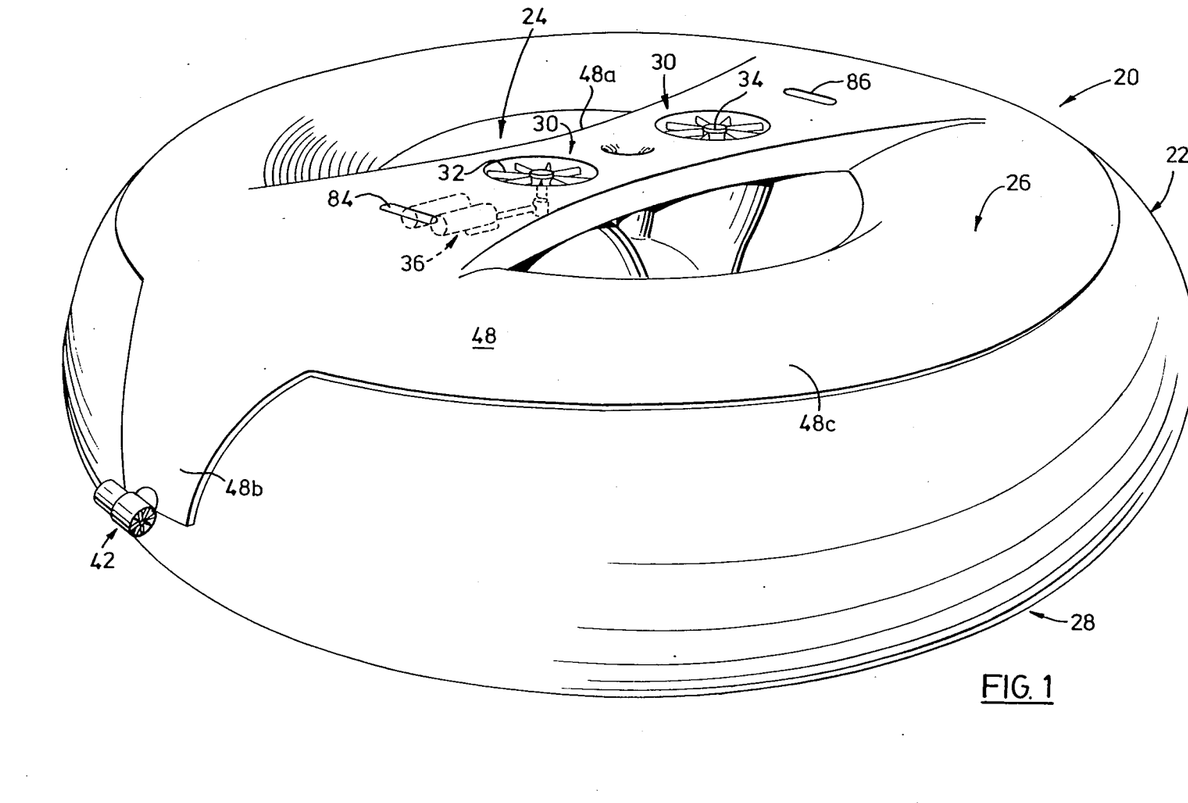
FIG. 1 is a perspective view from above of an air vehicle in accordance with a first embodiment of the invention.
Figure 2:
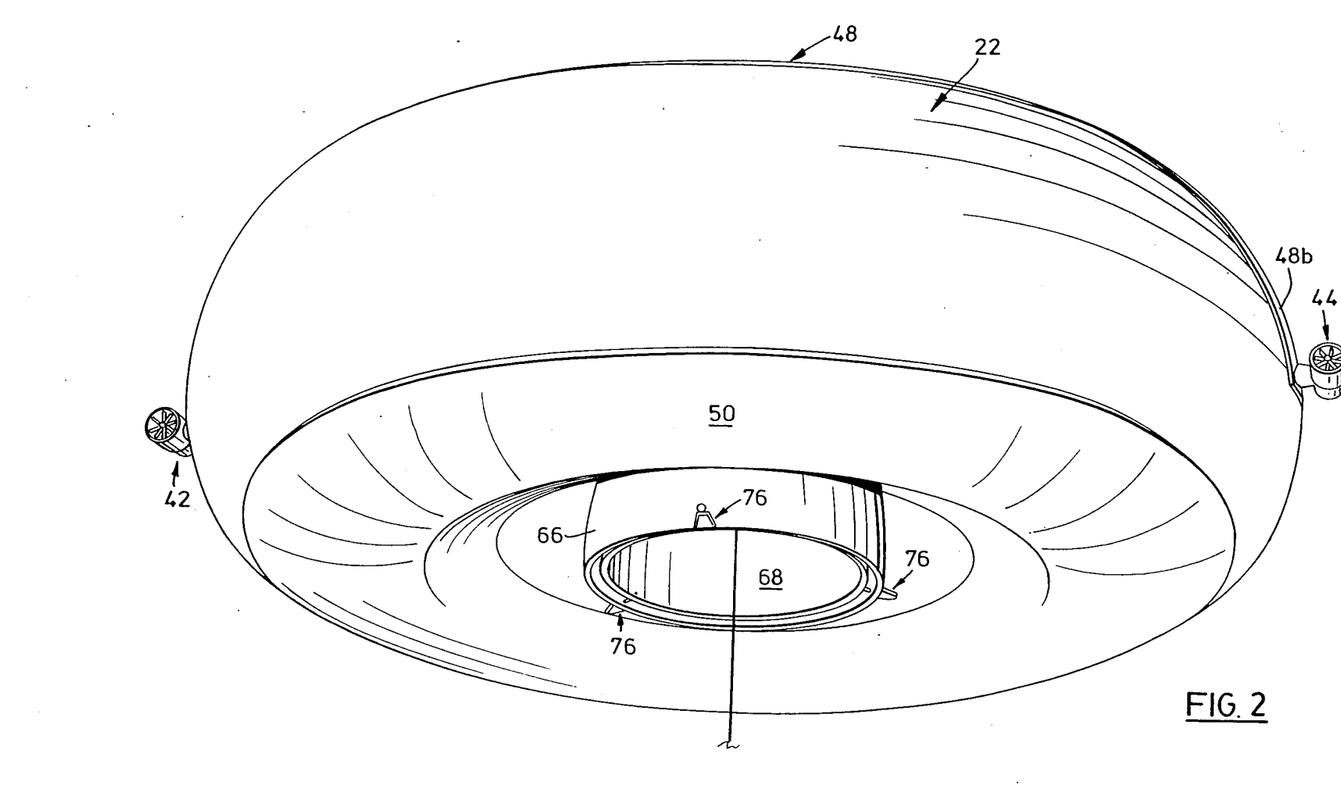
FIG. 2 is an underneath perspective view corresponding to FIG. 1.
Figure 3:
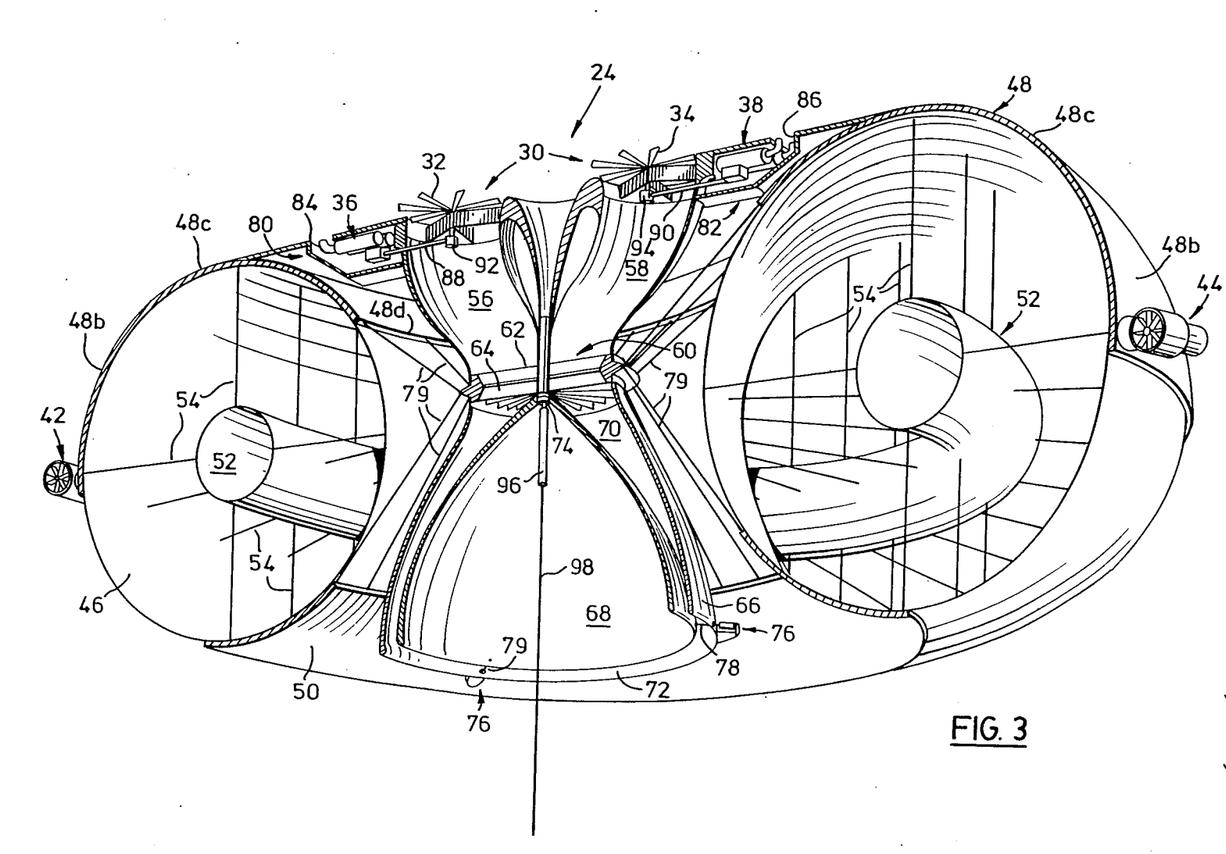
FIG. 3 is a vertical sectional view through the vehicle shown in FIGS. 1 and 2.

Referring first to FIGS. 1 to 3 an air vehicle is generally denoted by reference numeral 20 and includes an envelope 22 having the general shape of a torus. A passageway generally denoted 24 extends between top and bottom surfaces 26 and 28 respectively of the envelope. The envelope contains a gas which is lighter than air (in practice, helium).

Fan means shown in FIGS. 1 and 3 and denoted generally 30 are carried by the envelope and arranged to direct air downwardly through passageway 24 to generate a downwardly vectored thrust for lifting the envelope. In this case, two fans 32 and 34 are provided and are driven individually by respective jet engines 36 and 38. The engines can be controlled to vary the magnitude of the thrust and hence the height of the vehicle in flight, in known manner.

The vehicle is provided with a pair of propulsion units in the form of jet engines 42 and 44 which are carried by the envelope and arranged for propelling the vehicle generally laterally.

Referring now more specifically to FIG. 3, the envelope 22 comprises essentially a non-rigid gas-impervious bag 46 having the general shape of a torus; the bag is normally maintained in an inflated condition by helium gas under pressure. Bag 46 is made of a polymeric material, in this embodiment the material sold under the trade mark MYLAR. A saddle, the shape of which can perhaps best be seen in FIG. 1 extends across the top of the bag and provides a support for the fans 30 and 32 and the engines by which they are driven. The saddle is generally indicated by reference numeral 48 and includes an elongate center portion 48a which extends generally diametrally of the torus and by which the fans 32, 34 and the engines 36, 38 are supported. Continuations 48b of the center portion 48a extend part way down the sides of the bag and carry the engines 42 and 44. The engines are disposed generally on a median plane through the torus. The saddle also includes an annular portion 48c which overlies the top of the bag 46 and in effect defines the top surface of the tours. As can best be seen in FIG. 3, this annular portion 48c also extends partially down the inside surface of the torus defining the opening 24 to the edge denoted 48d in FIG. 3.

Adjacent the bottom of passageway 24 is a second annular member denoted 50 which is also of an arcuate shape in cross-section conforming generally to the curvature of bag 46. The bag is secured by adhesive to the bottom member 50 and to the saddle 48 so that the member and saddle partially support the bag in its inflated condition.

Saddle 48 and member 50 are bonded structures typically formed from an epoxy resin matrix and aramid fibers such as those sold under the trade mark KEVLAR. Glass and/or carbon fibers may also be incorporated. Other alternative materials are aluminum and titanium.

An air bag 52 is provided inside the torus 22 and comprising a closed tubular structure disposed generally on the center line of the torus and maintained in position by supporting wires indicated at 54. Bag 52 contains air and can be inflated or deflated to control the buoyancy of the envelope, as is conventional in air ships. When the air bag 52 is inflated the density of the helium within the bag 46 is increased, reducing its buoyancy. Conversely, deflation of air bag 52 allows the density of the helium to decrease, increasing its buoyancy. A suitable air pump, power source and control equipment will of course be provided in the vehicle for inflating and deflating the air bag 52. This equipment will be carried from the saddle 48 of the vehicle but, for simplicity, has not been shown since it forms no part of the present invention and is similar to equipment conventionally used in air ships.

With continued reference to FIG. 3, it will be seen that each of the lift fans 32, 34 is supported on saddle 48 above an associated duct, 56, 58 extending downwardly from the saddle. The two ducts 56, 58 merge at a circular chamber 60 generally at the center of the torus 22. Chamber 60 contains two stacked, contra-rotating, free-wheeling fans 62, 64 rotatable about the center line of chamber 60. These fans are designed to turn in opposite directions under the influence of air from the fans 32, 34 and serve to mix the air into a uniform, downwardly directed stream. That stream enters a discharge duct within a somewhat conically shaped duct member 66, in the center of which is suspended a bell-shaped duct member 68. The two members define therebetween a narrow duct 70 which is generally of hollow conical shape and which defines an annular air outlet nozzle 72 at the bottom of the torus. Accordingly, air leaves nozzle 72 in an annular stream or curtain around the perimeter of the bell member 68.

Member 68 is suspended at its apex from a universal joint 74 carried at the lower end of a shaft about which the two fans 62 and 64 rotate. The universal joint 74 allows the bell member 68 to be deflected laterally with respect to the outer member 66 to vary the shape of nozzle 72 and hence the configuration of the curtain of air issuing from the nozzle. By changing the configuration of the air stream in this way, the attitude of the vehicle can be controlled in flight. This is accomplished by three actuators mutually spaced at 120° about the perimeter of nozzle 72. Two of those actuators are visible in FIG. 3 and are donated by reference numeral 76. Referring to the actuator which is seen at the right in FIG. 3, each actuator is carried by the outer duct member 66 and includes an operating member 78 which extends inwardly and is coupled to the bell member at its outer end. Each actuator comprises a fast acting stepping motor operated by suitable control equipment (not shown) carried by the saddle 48 of the vehicle. In an alternative embodiment, the actuator 76 could be replaced by other forms of actuator, for example, hydraulic cylinders.

The duct assembly comprising the ducts 56, 58, chamber 60 and the members 66 and 70 may all be formed as bonded structures from the same materials as the saddle 48 and bottom member 50.

Guy wires 79 stabilize the duct assembly with respect to the saddle 48 and bottom member 50.

The two jet engines 36 and 38 are located within respective housings 80 and 82 at the underside of the center portion 48a of saddle 48 and have suitable vents 84 and 86. The engines themselves are essentially conventional aircraft-type jet engines connected through suitable gearboxes to respective drive shafts 88 and 90 coupled to the asociated fans 32 and 34 respectively. Suitable angle drives 92 and 94 connect the drive shafts to the fan axles.

The universal joint 74 at the apex of the bell member 68 is also used as an attachment point for suspending loads from the vehicle. As shown in FIG. 3, an attenuator 96 is suspended from the universal joint 74 and extends downwardly from the vehicle as indicated by line 98 for attachment of loads below the vehicle. Attenuator 96 takes the form of a hydraulic cylinder and performs a shock absorbing function in the suspensioin line. Typically, the attenuator will be quite short and a cable or other suspension element will extend downwardly from the attentuator for actually carrying the load.

The two engines 42 and 44 for propelling the vehicle laterally through the air are also essentially conventional jet engines and are positioned at diametrally opposite sides of the torus for use in maneuvering the vehicle. The engines are reversible.

Figure 4:
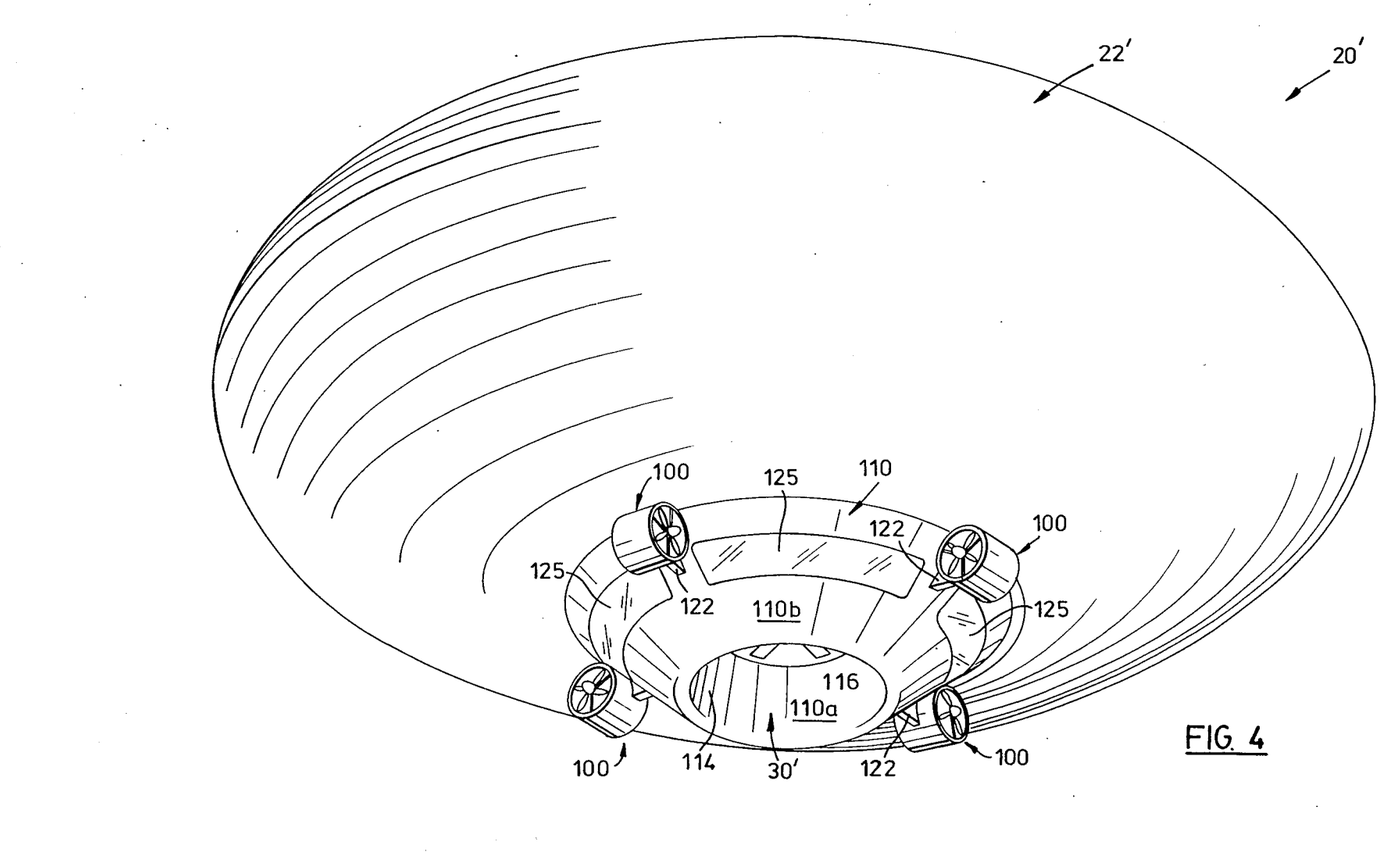
FIG. 4 is an underneath perspective view of a vehicle in accordance with a second embodiment of the invention.
Figure 5:
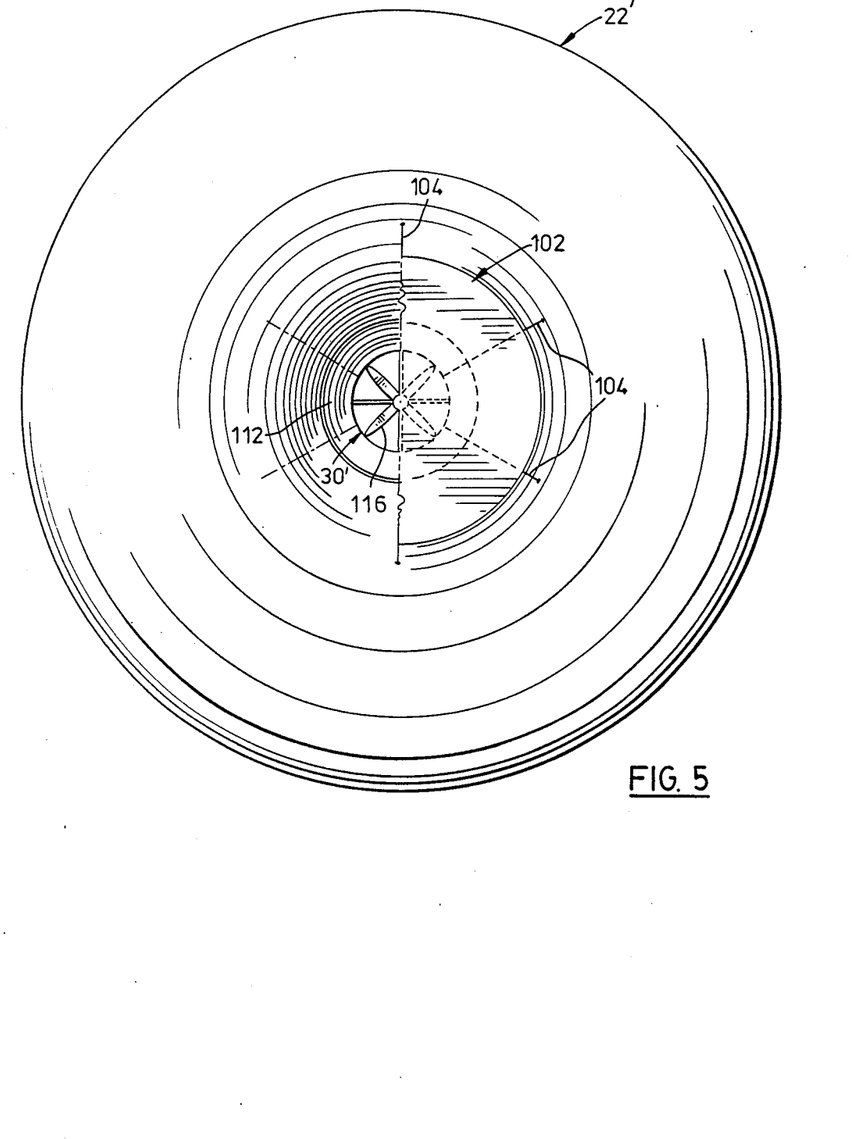
FIG. 5 is a plan view corresponding to FIG. 1, partly in section.
Figures 6, 7:
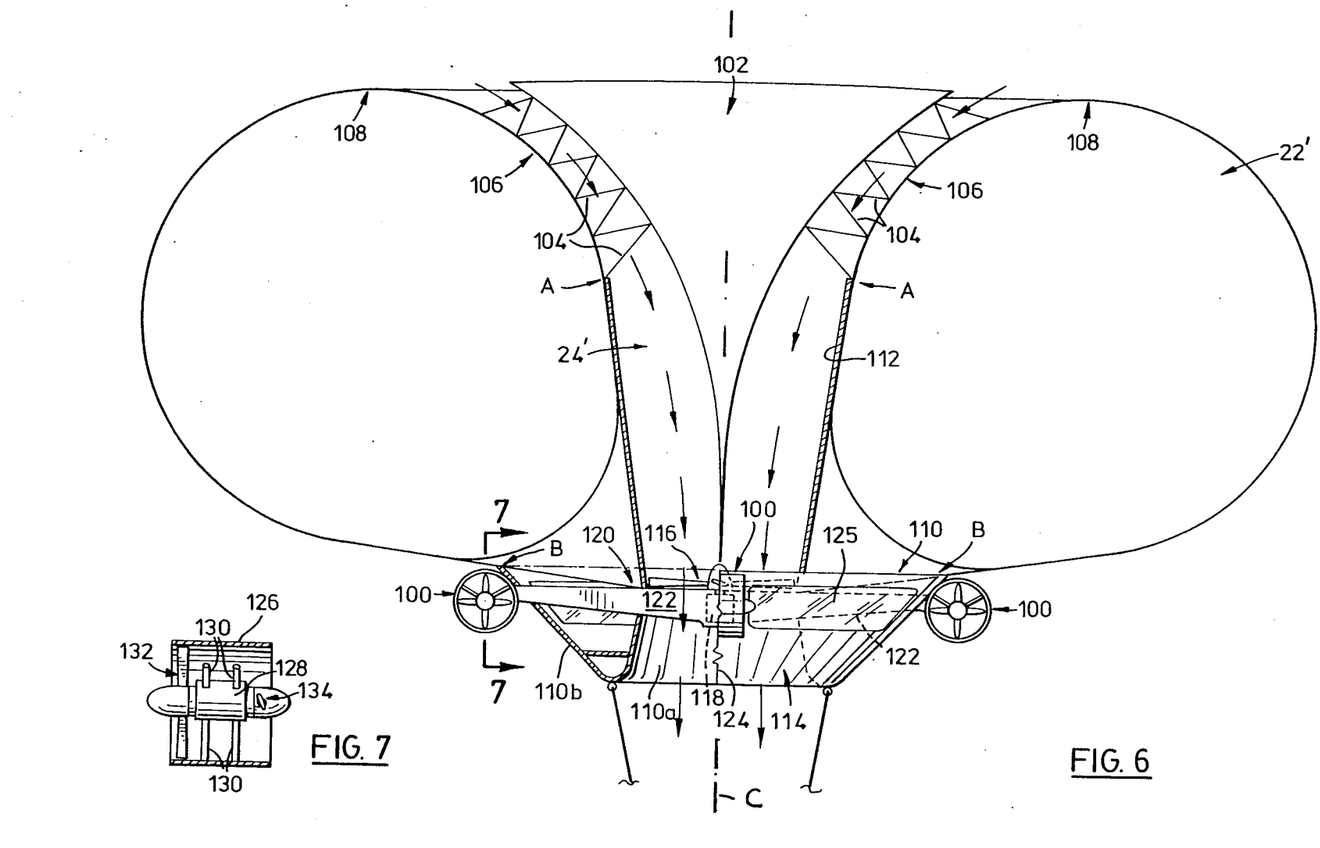

Reference will now be made to FIGS. 4, 5 and 6 in describing a second embodiment of the invention. In those views, primed reference numerals will be used to denote parts corresponding with parts shown in FIGS. 1 to 3.

The vehicle shown in FIGS. 4 to 6 has the same principal components as the vehicle shown in the previous views, namely a torus-shaped envelope 22' defining a central passageway 24', fan means 30', and propulsion means, in this case represented by four generally laterally directed jet engines individually denoted 100.

Referring primarily to FIG. 6, it will be seen that the torus-shaped envelope 22' is generally similar to the envelope 22 of the previous views although of somewhat different cross-sectional shape, and that the saddle 48 of the previous embodiment has been omitted. The torus itself may be of the same construction as in the previous embodiments and may have an internal air bag as bag 52 if required. Instead of being disposed at the top of the passageway through the tours, the fan means 30' in the embodiment of FIG. 6 is positioned at the bottom of the passageway and draws air downwardly through the passageway.

At the top of passageway 24' is a member 102 having the general shape of an inverted cone with a concave profile and a flat base. The member is arranged so that its base is disposed generally in the same plane as the top surface of the torus for minimizing drag as the vehicle moves through the air. The member is located by guy wires 104 extending between it and the envelope 22' and is positioned with its concave surfaces spaced from the opposing surfaces of the envelope 22' so that the shape of passageway 24' is in effect defined between the envelope and the member 102. As seen in horizontal section, the passageway has an annular shape, the diameter of which gradually increases towards the top of the torus, where the passageway flares outwardly and merges smoothly with the top surface of the envelope. Member 102 is arranged so that the width of the annulus decreases somewhat towards the top surface of the torus generally in the regions indicated by arrows 106 in FIG. 6, to achieve a venturi effect causing the velocity of the air entering the passageway 24' to be accelerated. Thus, the air being drawn into the passageway by the fan means 30' is drawn over the convex profile generally denoted 108 at the top of the torus and is accelerated, creating a low pressure area above surface 108 which tends to augment the lifting forces being imposed on the envelope. In other words, a "wing" effect is created, increasing the lifting forces acting on the vehicle.

Means may be provided for tilting member 102 to change the shape of passageway 24', to control the stability and/or pitch of the vehicle. These means may be essentially similar to the actuators used for duct member 68 in the preceding embodiment.

In an alternative embodiment, member 102 may be omitted.

The fan means 30' of the vehicle is supported by a "gondola" structure 110 which is in turn carried at the lower end of a member 112 disposed within the passageway 24' through the envelope 22'. Member 112 has the general shape of an inverted cone, the upper end of which is of greater diameter than the minimum diameter of passageway 24' when the envelope 22' is fully inflated so that the member tends to be held in the passageway by the envelope. The lower end of member 112 defines a discharge opeing of passageway 24' on the center line C of the vehicle. The envelope is also secured to the member by adhesive. The envelope extends to the lower edge of member 112 and accordingly has the general shape of a pear drop in this embodiment. This arrangement has been found to distribute stresses uniformly and directly to the envelope surface and avoids the need for guy wires secured to load patches on the envelope, as is conventional in the art. In an alternative enbodiment, the envelope could, in itself, be an incomplete torus shape and attached to the upper end of member 112 and the outer extremity of the gondola, for example at the points denoted A and B in FIG. 6. Member 112 and the gondola would then have to be designed to, in effect, complete the torus. It is believed that this configuration would offer advantages in terms of lowering the maximum stress on the envelope because the stress would then be exerted over a larger diameter area.

Gondola 110 has a central opening 114 which has substantially the same diameter as the lower end of member 112. The fan means 30' takes the form of a fan 116 disposed with its axis of rotation coincident with the axis of member 112 and passageway 114.

Fan 116 is supported by a "spider" structure 120 comprising four arms 122 disposed generally mutually at right angles and extending outwardly through the gondola 110 from the center of opening 114. The structure is held in place by virtue of the fact that the arms 122 extend through the walls of the gondola as shown at the lefthand side of the gondola in FIG. 6. It will be understood that the gondola is shown partly sectioned in that view about a section line 124; the portion of the drawing to the right of the section line shows the external appearance of the gondola including part of one of the propulsion units 100 while the portion of the drawing to the left of the center line shows the gondola structure in section. This latter portion of the view clearly indicates the fact that the gondola includes an inner wall 110a which defines the opening 114, and an outer wall 110b which extends upwardly and outwardly from the lower end of the inner wall 110a. The arms 122 of spider structure 120 extend through openings in both of those walls. If necessary, the arms may be retained by suitable retaining means (not shown).

The space between the two walls 110a and 110b of the gondola may be used to house control equipment, fuel tanks, power supplies, etc., or even for carrying passengers in larger vehicles. For the sake of illustration, windows have been shown at 125 but, of course, need not necessarily be present.

The gondola structure and member 112 are made as bonded matrix/fiber structures as discussed previously in connection with the preceding embodiment.

Each of the propulsion units 100 is mounted at the outer end of one of the spider structure arms 122. FIG. 7 is a vertical sectional view through a typical one of those propulsion units. The unit includes a housing 126 surrounding a reversible electric motor 128 supported by struts 130 from the housing 126. The motor has a drive shaft which projects from both ends of the motor housing and the shaft is fitted at each end with a propellor. The two propellors are denoted respectively 132 and 134 in FIG. 7 and are positioned at 90° with respect to one another. The blades of the propellors are designed to produce equal thrust in whichever direction the motor turns.

Reversible electric motors may not be suitable for large size vehicles. Alternatives are gas or jet engines with reversible transmission systems or arrangements using two engines. Another possibility would be to use a ducted air system (vectored thrust). A still further possibility is to use a non-reversible motor or engine with a variable pitch propeller capable of being controlled to provide thrust selectively in forward or reverse directions.

FIG. 4 shows the relative orientations of the four propulsion units 100. It will be seen that the units are spaced mutually at 90° from one another about the vertical center line C of the vehicle and are oriented so that the thrust vector of each unit is generally tangential to a notional circle drawn on that center line and passing through all four units. It has been found that this orientation of propulsion units coupled with the feature of reversibility discussed above allows for substantial maneuverability of the vehicle in flight. In an alternative embodiment, three propulsion units equally spaced around the gondola could be used.

Again, suitable control equipment will have to be provided for the propulsion units but will be essentially conventional and, for that reason, has not been shown in detail.

In summary, a vehicle of the form described above derives lift forces both from the gas within the torus shaped envelope of the vehicle and from the lift fan or fans which provide readily controllable vectored thrust for varying the altitude of the vehicle. Independent control of all directions of lateral movement (including left, right and yaw) is also provided. In addition, the embodiment of FIGS. 5 to 7 provides additional lift by virtue of the "wing effect" of air flowing over the top surface of the torus.

It has been found in experiments that the resulting vehicle is stable and controllable and capable of lifting useful, significant payloads.

By way of example, it is envisaged that a vehicle in accordance with the invention may be constructed with an envelope diameter of 140 feet and an envelope height of 55 feet, an operating altitude of 4,000 feet and a maximum forward air speed of 40 m.p.h. These dimensions of course given by way of example only and may vary in practice. The vehicle could also be built to a relatively small scale for use as a toy.

It should of course be understood that the preceding description relates to a particular preferred embodiment of the invention only and that many modifications are possible within the broad scope of the invention. For example, the specific materials referred to previously are given by way of example only and are not to be considered as limiting. Obviously, variations may also be made in the manner in which the load is suspended from the vehicle; while suspension on the center line of the vehicle is to be preferred, the load could be suspended in other ways, for example from the saddle in the case of the first embodiment or from peripheral points on the gondola in the second embodiment.

In the illustrated embodiments, the envelope of the vehicle is formed of a MYLAR fabric and there is of course no limitation to this particular fabric; within the broad scope of the invention, the envelope could even be rigid.

In the embodiment of FIGS. 1, 2 and 3, the arrangement for controlling the attitude of the vehicle could be changed so that the outer duct member 66 would be displaceable with respect to the inner duct member 68 instead of the reverse arrangement shown.

The engines and motors used in the vehicle need not be of the types specifically described above. For example, the engines 36 and 38 in the first embodiment need not be jet engines.

Finally, the term "torus" as used herein is to be interpreted broadly. For example, the term includes shapes such as those shown in FIG. 6 and those which result in a section through the torus having an elliptical or flattened elliptical shape. In the latter case the torus would have a shape similar to that of a "flying saucer".

We claim:

1. An air vehicle comprising:
   an envelope having the general shape of a torus extending about a passageway between top and bottom surfaces of the envelope, the envelope containing a gas which is lighter than air, said passageway being of inverted generally frusto-conical shape flaring outwardly adjacent its upper end and merging smoothly into said top surface of the torus, said passageway tapering inwardly toward said bottom surface of the torus to a discharge opening in said surface on a vertical center line of the vehicle;
   fan means carried by the envelope and arranged to direct air downwardly through the passageway to generate a downwardly vectored thrust for lifting the vehicle, the fan means being controllable to vary the magnitude of the thrust and hence the altitude of the vehicle in flight;
   propulsion means carried by the envelope and adapted for generally lateral propulsion of the vehicle; and,
   a gondola suspended from said envelope at the lower end of said passageway and supporting said fan means for drawing air downwardly through the passageway and generating said thrust, the gondola defining a central opening which is on said center line of the vehicle and coincident with said discharge opening, and through which air is directed downwardly from the passageway.

2. A vehicle as claimed in claim 1, wherein said propulsion means comprise at least three laterally directed propulsion units supported externally on the gondola.

3. A vehicle as claimed in claim 2, wherein four said propulsion units are provided and are disposed generally on a circle centered on the vertical center line of the envelope and arranged to generate thrust vectors each extending generally tangentially with respect to said circle, the units being arranged in pairs with the units in each pair at the opposite ends of a diameter of said circle and said diameters mutually at right angles and the thrust vectors of each pair of propulsion units generally parallel.

4. A vehicle as claimed in claim 3, further comprising a structure carried by the gondola and comprising four limbs disposed mutually at right angles and extending outwardly from said center line, each said limb carrying one of said propulsion units at its outer end, said structure carrying said fan means generally on said center line.

5. A vehicle as claimed in claim 1, wherein said passageway includes a rigid member of inverted frustoconical shape coupled to the envelope, and from which said gondola is suspended.

6. An air vehicle comprising:
   an envelope having the general shape of a torus extending about a passageway between top and bottom surfaces of the envelope, the envelope containing a gas which is lighter than air;
   fan means carried by the envelope and arranged to direct air downwardly through the passageway to generate a downwardly vectored thrust for lifting the vehicle, the fan means being controllable to vary the magnitude of the thrust and hence the altitude of the vehicle in flight;

propulsion means carried by the envelope and adapted for generally lateral propulsion of the vehicle; and, a saddle supported on said top surface of the envelope and including at least a portion extending generally diametrally across said top surface of the envelope and carrying said fan means, portions at opposite ends of said diametral portion extending at least partially down opposite sides of the envelope and each carrying a propulsion unit disposed generally on a horizontal median plane of the envelope, said propulsion units defining said propulsion means of the vehicle, said fan means comprising first and second fans disposed side by side and arranged to discharge downwardly into duct means forming said passageway through the envelope, said duct means comprising respective first and second ducts, each receiving air from one of said fans, and a common chamber into which said ducts discharge, said chamber receiving a pair of stacked contra-rotating, freewheeling fans for mixing of the air received from said first and second ducts, said duct means further defining a discharge duct receiving air from said chamber and from which air is directed downwardly for creating said thrust for lifting the vehicle.

7. A vehicle as claimed in claim 6, wherein said discharge duct is of annular shape in cross-section and is defined between respective inner and outer duct members forming an annular nozzle at the outer end of said discharge duct, one of said duct members being displaceable laterally with respect to the other duct member to vary the shape of said nozzle for controlling the attitude of the vehicle, the vehicle further including actuator means coupled to said displaceable duct member for controlling its position in use according to the required attitude of the vehicle.

8. A vehicle as claimed in claim 7, wherein said inner duct member has the general shape of a bell and is suspended at its apex within said duct whereby the inner duct member is laterally displaceable to vary the shape of said nozzle, the actuator means comprising a plurality of individual actuators extending between said inner and outer duct members at positions spaced around said annular nozzle for controlling the position of the bell-shaped inner duct member with respect to the outer duct member, said outer duct member being fixed.

9. A vehicle as claimed in claim 6, further comprising load suspension means extending downwardly from said inner duct member and suspended from its said apex.

10. An air vehicle comprising:
an envelope having the general shape of a torus extending about a passageway between top and bottom surfaces of the envelope, the envelope containing a gas which is lighter than air;

fan means carried by the envelope and arranged to direct air downwardly through the passageway to generate a downwardly vectored thrust for lifting the vehicle, the fan means being controllable to vary the magnitude of the thrust and hence the altitude of the vehicle in flight; and, propulsion means carried by the envelope and adapted for generally lateral propulsion of the vehicle;

wherein said passageway is flared outwardly adjacent its upper end and merges smoothly into said top surface of the torus so that air entering said passageway flows inwardly over said top surface, and wherein the vehicle further comprises a member disposed centrally in said upper end of the passageway, and shaped so that said upper portion of the passageway is annular in cross-section and includes a narrowed annular section providing a venturi effect for causing accelerated flow of induced air over said top surface of the torus, for generating lift, said central member comprising a non-rigid inflatable member containing a gas which is lighter than air for contributing to the buoyancy of the vehicle.

11. A vehicle as claimed in claim 10, wherein said central member has the general shape of an inverted cone with a concave profile and a flat base, said base being disposed generally in a plane containing the topmost surface of the envelope, for minimizing drag caused by said member in use.

* * * * *